(12) United States Patent
Park et al.

(10) Patent No.: US 11,820,362 B2
(45) Date of Patent: Nov. 21, 2023

(54) METHOD AND APPARATUS FOR CONTROLLING GEAR-SHIFTING AND ENGINE CLUTCH CONNECTION IN HYBRID VEHICLE

(71) Applicants: HYUNDAI MOTOR COMPANY, Seoul (KR); KIA MOTORS CORPORATION, Seoul (KR)

(72) Inventors: Ji Hyun Park, Hwaseong-si (KR); Moon Kyung Joo, Seoul (KR); Jin Kuk Cho, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 177 days.

(21) Appl. No.: 17/109,393

(22) Filed: Dec. 2, 2020

(65) Prior Publication Data
US 2021/0387612 A1 Dec. 16, 2021

(30) Foreign Application Priority Data
Jun. 10, 2020 (KR) .......................... 10-2020-0070349

(51) Int. Cl.
*B60W 20/40* (2016.01)
*B60W 20/30* (2016.01)
*B60W 20/15* (2016.01)

(52) U.S. Cl.
CPC ........... *B60W 20/40* (2013.01); *B60W 20/15* (2016.01); *B60W 20/30* (2013.01); *B60W 2510/0208* (2013.01); *B60W 2510/083* (2013.01); *B60W 2510/105* (2013.01); *B60W 2520/40* (2013.01)

(58) Field of Classification Search
CPC ...... B60W 20/40; B60W 20/15; B60W 20/30; B60W 2510/0208; B60W 2510/083; B60W 2510/105; B60W 2520/40
USPC ......................................................... 701/22
See application file for complete search history.

(56) References Cited

U.S. PATENT DOCUMENTS

| 4,854,413 A | * | 8/1989 | Kameda | B60K 17/3467 180/247 |
| 5,311,795 A | * | 5/1994 | Yoshimura | F16H 61/061 477/131 |
| 5,505,670 A | * | 4/1996 | Inuzuka | F16H 61/143 477/65 |

(Continued)

FOREIGN PATENT DOCUMENTS

KR      10-1040349 B1    6/2011

*Primary Examiner* — Vivek D Koppikar
*Assistant Examiner* — Dominick Mulder
(74) *Attorney, Agent, or Firm* — LEMPIA SUMMERFIELD KATZ LLC

(57) ABSTRACT

A control method for controlling gear-shifting and lock-up of an engine clutch in a hybrid vehicle includes: detecting a kickdown shift by a driver while the hybrid vehicle is driving in an electric vehicle mode; starting gear-shifting when the kickdown shift is detected; controlling a difference between an engine speed and a motor speed to be equal to or less than a first reference value; synchronizing the engine speed and the motor speed through an engine speed control; performing torque blending by locking up the engine clutch when the synchronization is completed; and ending the gear-shifting when a target required torque is reached through the torque blending.

16 Claims, 10 Drawing Sheets

(56) References Cited

U.S. PATENT DOCUMENTS

| | | | | |
|---|---|---|---|---|
| 5,980,426 A * | 11/1999 | Kamada | ............... | F16H 61/061 |
| | | | | 477/158 |
| 2012/0010041 A1* | 1/2012 | Soliman | ............... | B60W 10/06 |
| | | | | 180/65.265 |
| 2013/0103241 A1* | 4/2013 | Koide | ............ | B60W 30/18145 |
| | | | | 903/903 |
| 2013/0296109 A1* | 11/2013 | Nedorezov | ........... | B60W 10/08 |
| | | | | 477/5 |
| 2013/0310219 A1* | 11/2013 | Whitney | ............... | B60W 10/11 |
| | | | | 477/109 |
| 2014/0018207 A1* | 1/2014 | Kobayashi | ............ | B60W 10/02 |
| | | | | 903/902 |
| 2015/0087475 A1* | 3/2015 | Dai | ......................... | B60K 6/38 |
| | | | | 477/4 |
| 2015/0175155 A1* | 6/2015 | Nakanishi | ............. | B60W 10/06 |
| | | | | 180/65.265 |
| 2016/0059846 A1* | 3/2016 | Wang | .................... | B60W 10/02 |
| | | | | 180/65.265 |
| 2017/0166192 A1* | 6/2017 | Jeon | ....................... | B60K 6/387 |
| 2018/0172090 A1* | 6/2018 | Kim | ....................... | F16D 48/06 |
| 2018/0244262 A1* | 8/2018 | Ruybal | ................ | B60W 10/113 |
| 2019/0168731 A1* | 6/2019 | Lee | ....................... | B60W 20/20 |
| 2019/0176799 A1* | 6/2019 | Christman | ............. | B60W 10/08 |

* cited by examiner

| CONTROL ORDER | ①Driver K/D DETERMINATION | ②ENGINE START | ③ENGINE CLUTCH ENGAGEMENT | ④ENGINE TORQUE TRANSFER | ⑤SHIFT COMPLETION |
|---|---|---|---|---|---|
| ENGINE | - | START | ENGINE SPEED CONTROL FF TORQUE + α | DRIVER'S REQUIRED TORQUE =MOTOR TORQUE+ ENGINE TORQUE (Part\|\|Full load) | DRIVER'S REQUIRED TORQUE =MOTOR TORQUE+ ENGINE TORQUE (Part\|\|Full load) |
| MOTOR | 0 | Max(DRIVER'S REQUIRED TORQUE, MAXIMUM MOTOR TOQUE) | Max(DRIVER'S REQUIRED TORQUE, MAXIMUM MOTOR TOQUE) + ANTIJERK TQ. | ≒ 0 | 0 |
| HSG | 0 | ENGINE STARTING TORQUE | (−)ENGINE SPEED CONTROL COMPENSATION (FB) TORQUE | | |
| DRIVING MODE | EV | Part load | Part load | Part load | Part load |
| E/C STATE | Open | Open | Open→Slip→Lockup | Lockup | Lockup |
| SHIFT PHASE | - | Preparation | Beginning | Actual Shift | Finishing Shift |
| E/C TRANSFER TOQUE | - | - | - | ≒ ENGINE TORQUE | ENGINE TORQUE |

FIG. 5

| CONTROL ORDER | ① Driver K/D DETERMINATION | ② ENGINE START | ③ ENGINE CLUTCH ENGAGEMENT | ④ ENGINE TORQUE TRANSFER | ⑤ SHIFT COMPLETION |
|---|---|---|---|---|---|
| ENGINE | — | START | ENGINE SPEED CONTROL TORQUE | DRIVER'S REQUIRED TORQUE =MOTOR TORQUE+ ENGINE TORQUE (Part‖Full load) | DRIVER'S REQUIRED TORQUE =MOTOR TORQUE+ ENGINE TORQUE (Part‖Full load) |
| MOTOR | 0 | Max(DRIVER'S REQUIRED TORQUE, MAXIMUM MOTOR TOQUE) | Max(DRIVER'S REQUIRED TORQUE, MAXIMUM MOTOR TOQUE) + ANTIJERK TQ. | DRIVER'S REQUIRED TORQUE =MOTOR TORQUE+ ENGINE TORQUE (Part‖Full load) | DRIVER'S REQUIRED TORQUE =MOTOR TORQUE+ ENGINE TORQUE (Part‖Full load) |
| DRIVING MODE | EV | Part load | Part load | Part load | Part load |
| E/C STATE | Open | Open | Open→Slip→Lockup | Lockup | Lockup |
| SHIFT PHASE | — | Preparation | Beginning | Actual Shift | Finishing Shift |
| E/C TRANSFER TOQUE | — | — | — | ≒ ENGINE TORQUE | ENGINE TORQUE |

FIG. 7

METHOD AND APPARATUS FOR CONTROLLING GEAR-SHIFTING AND ENGINE CLUTCH CONNECTION IN HYBRID VEHICLE

CROSS-REFERENCE TO RELATED APPLICATION

This application claims priority to and the benefit of Korean Patent Application No. 10-2020-0070349, filed on Jun. 10, 2020, the entire contents of which are incorporated herein by reference.

FIELD

The present disclosure relates to hybrid vehicle control, and more particularly, to an engine clutch lock-up control technique during gear-gear-shifting of a hybrid vehicle.

BACKGROUND

The statements in this section merely provide background information related to the present disclosure and may not constitute prior art.

Among eco-friendly vehicles, a hybrid vehicle is a vehicle that adopts a motor as well as an engine as a power source to reduce exhaust gas and improve fuel efficiency, and includes a power transfer system that separately transfers an engine power or a motor power to a driving wheel, or transfer the engine power and the motor power together to the driving wheel.

As illustrated in FIG. 1, a power transfer system for a hybrid vehicle includes an engine 10 and a motor 20 arranged in series with each other, an engine clutch 30 arranged between the engine 10 and the motor 20 to transmit or disconnect engine power, a transmission 40 for transferring power of the motor 20 alone or power of the motor 20 and the engine 10 to a driving wheel, a hybrid starter & generator (HSG) 50, which is a kind of motor that is connected to a crank pulley of the engine 10 as a structure capable of transferring power to control the start and power generation of the engine 10, an inverter 70 for controlling the motor 20 and power generation control, a battery 60 which is connected to the inverter 70 to be charged or discharged to supply electric power to the motor 20 and the like, etc.

The hybrid vehicle is driven by a sum of output torques of an engine and a motor simultaneously with lock-up of an engine clutch in a hybrid mode, and is driven by the output torque of the motor as the engine clutch is disengaged in an electric vehicle mode.

When the electric vehicle mode is changed to the hybrid mode, a speed of an input terminal of the engine clutch that is connected to an output side of the engine and a speed of an output terminal of the engine clutch that is connected to an input side of the motor, i.e., a speed of the engine and a speed of the motor should be synchronized with each other. The purpose of this synchronization is to prevent engine clutch slip and vibration/noise due to a speed difference between the engine and the motor when the engine clutch is locked up.

However, we have discovered that in the case where the electric vehicle mode is changed to the hybrid mode, when the speed of the engine and the speed of the motor are synchronized by lock-up of the engine clutch, there is a problem in that a driver experiences delay in acceleration of the vehicle due to a pre-engagement and post-shift method that sequentially performs a gear-gear-shifting control.

The above information disclosed in this Background section is only for enhancement of understanding of the background of the present disclosure, and therefore it may contain information that does not form the prior art that is already known to a person of ordinary skill in the art.

SUMMARY

The present disclosure provides an engine clutch lock-up control method and apparatus during gear-gear-shifting of a hybrid vehicle.

Another exemplary form of the present disclosure is directed to an engine clutch lock-up control method during gear-shifting of a hybrid vehicle and the hybrid vehicle using the same, capable of ameliorating a sense of acceleration delay of the hybrid vehicle and improving acceleration linearity before and after gear-shifting by performing shift-down shift together with engagement of an engine clutch when a kickdown is detected during driving in an electric vehicle mode in a transmission mounted electric device (TMED) type of hybrid vehicle.

The present disclosure also provides an engine clutch lock-up control method and apparatus during gear-shifting of a hybrid vehicle, capable of ameliorating engine torque inaccuracy during blending of an engine-motor torque to improve control robustness and drivability.

Another exemplary form of the present disclosure provides an engine clutch lock-up control method and apparatus for a hybrid vehicle, capable of assisting an engine torque through fast engine clutch lock-up when a motor is derated in a low battery state of charge (SOC).

The technical objects of the present disclosure are not limited to the objects mentioned above, and other technical objects not mentioned can be clearly understood by those skilled in the art from the description of the claims.

An exemplary form of the present disclosure provides a method for controlling gear-shifting and lock-up of an engine clutch in a hybrid vehicle equipped with an engine clutch between an engine and a motor. In particular, the method includes: detecting a kickdown shift by a driver while the hybrid vehicle is driving in an electric vehicle mode; starting gear-shifting when the kickdown shift is detected; controlling a difference between an engine speed and a motor speed to be equal to or less than a first reference value; synchronizing the engine speed and the motor speed through engine speed control; performing torque blending by locking up the engine clutch when the synchronization is completed; and ending the gear-shifting when a target required torque is reached through the torque blending.

In an exemplary form, the controlling of the difference between the engine speed and the motor speed may include: checking whether the engine is driven; performing engine part load control until the engine speed reaches a second reference value while the engine is driven; and opening a throttle valve by a target opening degree when the engine speed reaches a second reference value.

In an exemplary form, the second reference value is a minimum speed corresponding to a torque that the engine is able to generate under a predetermined condition.

In an exemplary form, the method may further include driving the engine when the engine is not driven as a result of the check.

In an exemplary form, the engine may be driven by any one of a hybrid starter-generator, an integrated starter-generator, and a starter.

In an exemplary form, the engine speed control may be performed by the hybrid starter-generator when the engine is driven by the hybrid starter-generator.

In an exemplary form, a driver's required torque is supported with a motor torque when a maximum motor torque is greater than or equal to the driver's required torque while performing the torque blending, and a charging torque of the hybrid integrated starter-generator may be controlled to decrease depending on a target transfer torque.

In an exemplary form, when the maximum motor torque is greater than the driver's required torque while performing the required torque, the starter-generator may perform charging as much as a remaining engine torque except for a torque required to control the engine speed before the engine clutch is locked up, and may reduce the charging torque of the starter-generator by calculating a target transfer torque required for the torque blending after the engine clutch is engaged.

In an exemplary form, a motor may be controlled to output a maximum torque, and a torque assist by the integrated starter-generator may be performed when the maximum motor torque is smaller than the driver's required torque while performing the torque blending.

In an exemplary form, the hybrid vehicle may include an engine management system for controlling an operation of the engine, and the engine speed control may be performed by the engine management system when the engine is driven by the integrated starter-generator or the starter.

In an exemplary form, the driver kickdown may be detected based on at least one of accelerator position sensor (APS) information and vehicle speed information of the hybrid vehicle.

In another exemplary form of the present disclosure, a hybrid vehicle includes: an engine; a motor; an engine clutch disposed between the engine and the motor; and a hybrid control unit configured to control operations of the engine, the motor, and the engine clutch wherein the hybrid control unit starts gear-shifting when it detects a kickdown shift by a driver while the hybrid vehicle is driving in an electric vehicle mode, controls a difference between an engine speed and a motor speed to be equal to or less than a first reference value, performs torque blending by locking up the engine clutch when the engine speed is synchronized with the motor speed through engine speed control, and ends the gear-shifting when a target required torque is reached through the torque blending.

In an exemplary form, the hybrid control unit may control engine part load control to be performed until the engine speed reaches a second reference value in a state in which the engine is driven, and may control a throttle valve to be opened by a target opening degree when the engine speed reaches the second reference value.

In an exemplary form, the second reference value may be a minimum speed corresponding to a torque that the engine is able to generate under a predetermined condition.

In an exemplary form, the hybrid control unit may drive the engine when the engine is not driven.

In an exemplary form, the engine may be driven by any one of a hybrid starter-generator, an integrated starter-generator, and a starter.

In an exemplary form, the hybrid control unit may control the engine speed control to be performed by the hybrid starter-generator when the engine is driven by the hybrid starter-generator.

In an exemplary form, a driver's required torque may be supported with the motor torque when the maximum motor torque is greater than or equal to the driver's required torque while performing the torque blending, and the hybrid control unit may control a charging torque of the hybrid integrated starter-generator may be controlled to decrease depending on a target transfer torque.

In an exemplary form, when the maximum motor torque is greater than the driver's required torque while performing the required torque, the starter-generator may perform charging as much as a remaining engine torque except for a torque required to control the engine speed before the engine clutch is locked up, and may reduce the charging torque of the starter-generator by calculating a target transfer torque required for the torque blending after the engine clutch is engaged.

In an exemplary form, a motor may be controlled to output a maximum torque, and a torque assist by the integrated starter-generator may be performed by the hybrid control unit when the maximum motor torque is smaller than the driver's required torque while performing the torque blending.

In an exemplary form, the hybrid vehicle may include an engine management system for controlling an operation of the engine, and the hybrid control unit may control the engine speed control to be performed by the engine management system when the engine is driven by the integrated starter-generator or the starter.

In an exemplary form, the hybrid vehicle may further include a vehicle information measure controller configured to provide accelerator position sensor (APS) information and vehicle speed information of the hybrid vehicle to the hybrid control unit, and the hybrid control unit detects the driver kickdown based on at least one of the vehicle speed information and the APS information.

Technical objects desired to be achieved in the present disclosure are not limited to the aforementioned objects, and other technical objects not described above will be apparent to those skilled in the art from the disclosure of the present disclosure.

The present disclosure has a merit that provides an engine clutch lock-up control method and apparatus during gear-shifting of a hybrid vehicle.

The present disclosure has a merit that provides provide an engine clutch lock-up control method and apparatus during gear-shifting of a hybrid vehicle, capable of ameliorating a sense of acceleration delay of the hybrid vehicle and improving acceleration linearity before and after gear-shifting by performing the down shift together with engagement of an engine clutch when a kickdown is detected during driving in an electric vehicle mode in a TMED type of hybrid vehicle.

In addition, the present disclosure has a merit that provides an engine clutch lock-up control method and apparatus during gear-shifting of a hybrid vehicle, capable of ameliorating engine torque inaccuracy during blending of an engine-motor torque to improve control robustness and drivability.

The present disclosure has a merit that provides an engine clutch lock-up control method and apparatus during gear-shifting of a hybrid vehicle, capable of effective state of charge (SOC) defense by assisting an engine torque through fast lock-up of an engine clutch when a motor is derated in a low battery SOC.

In addition, various effects that can be directly or indirectly identified through this document may be provided.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 5 illustrates a table summarizing a procedure for performing the engine clutch lock-up control during gear-shifting in the hybrid vehicle, described in FIG. 4;

FIG. 7 illustrates a table summarizing a procedure for performing the engine clutch lock-up control during gear-shifting in the hybrid vehicle, described in FIG. 6;

Figure 1:
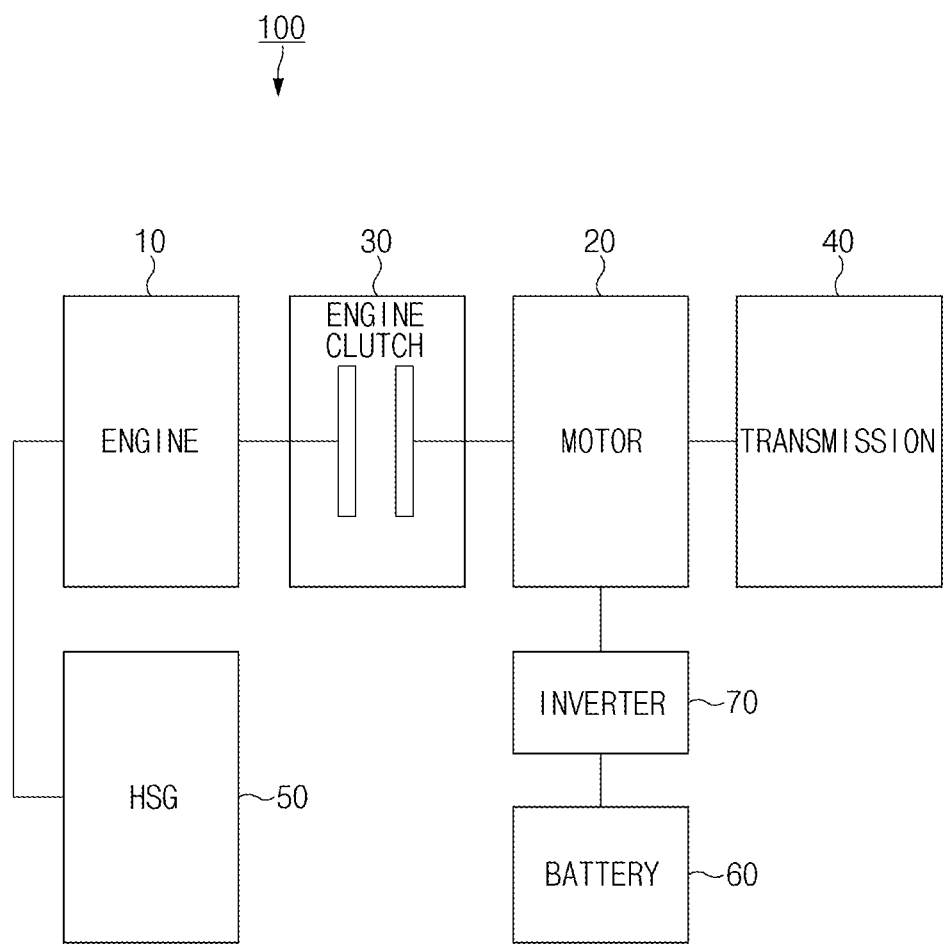
FIG. 1 illustrates a structure of a transmission mounted electric device (TMED) type of hybrid vehicle including a general automatic transmission.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some exemplary forms of the present disclosure will be described in detail with reference to exemplary drawings. It should be noted that in adding reference numerals to constituent elements of each drawing, the same constituent elements have the same reference numerals as possible even though they are indicated on different drawings. In addition, in describing exemplary forms of the present disclosure, when it is determined that detailed descriptions of related well-known configurations or functions interfere with understanding of the exemplary forms of the present disclosure, the detailed descriptions thereof will be omitted.

In describing constituent elements according to an exemplary form of the present disclosure, terms such as first, second, A, B, (a), and (b) may be used. These terms are only for distinguishing the constituent elements from other constituent elements, and the nature, sequences, or orders of the constituent elements are not limited by the terms. In addition, all terms used herein including technical scientific terms have the same meanings as those which are generally understood by those skilled in the technical field to which the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, exemplary forms of the present disclosure will be described in detail with reference to FIG. 1 to FIG. 7.

FIG. 1 illustrates a structure of a transmission mounted electric device (TMED) type of hybrid vehicle including a general automatic transmission.

As illustrated in FIG. 1, in the case of a hybrid vehicle 100 in which an engine clutch 30 is installed between an engine 10 and a motor 20, the motor 20 is typically installed in a transmission 40, and thus the hybrid vehicle having the configuration shown in FIG. 1 is also referred to as a TMED type of hybrid vehicle.

Referring to FIG. 1, the hybrid vehicle 100 is configured to include the engine 10, the motor 20, the engine clutch 30 for controlling power between the engine 10 and the motor 20, the transmission 40, a hybrid starter-generator (HSG) 50, a high voltage battery 60, and an inverter 70.

The motor 20 of the hybrid vehicle 100 is mounted in the transmission 40, assists the engine 10 during acceleration, and acts as a generator to charge the battery 60 during deceleration.

In the case of the hybrid vehicle 100, when it drives at a low speed, a power is transferred to the transmission 40 by using only a driving force of the motor 20 without using a power of the engine 10, and thus no power transferring is required between the engine 10 and the motor 20. However, during high-speed driving and acceleration, the driving force of the motor 20 cannot generate a torque desired by a driver, and thus the engine clutch 30 is hydraulically controlled such that the engine 10 can generate a driving force together to enable hybrid driving.

The HSG 50 may start the engine 10 when switching from an electric vehicle mode (EV Mode) to a hybrid mode (HEV mode).

The hybrid vehicle 100 may perform power generation control for forcibly starting the engine 10 through the HSG 50 when a state of charge (SOC) of the high voltage battery 60 falls to be equal to or lower than a reference value.

After starting the engine 10 in the EV mode, the hybrid vehicle 100 may engage the engine clutch 30 after performing engine speed control for quickly increasing a speed of the engine 10 to match a rotation speed of the engine and a rotation speed of a driving shaft for smooth connection between the power of the engine 10 and the power of the motor 20, to reduce or minimize shock and vibration caused by the engine clutch 30.

In addition, the hybrid vehicle 100 may perform a soft landing control that reduces or minimizes vibration of the engine 10 by applying a load to the HSG 50 when starting off.

When a kickdown, i.e., a situation in which an automatic gear-shifting vehicle needs to increase the acceleration momentarily while driving, occurs while a driver drives an electric vehicle (EV), the engine 10 should be started, the engine clutch 30 should be locked up, and lower gear shift and torque blending should be completed.

In an exemplary form, a double clutch transmission (DCT) type in which a motor is not integrated into a transmission, the motor and the transmission are separately arranged to have a separate structure, and two separate clutches for odd and even gear sets are used, may be applied to a TMED type of hybrid vehicle.

Figure 2:
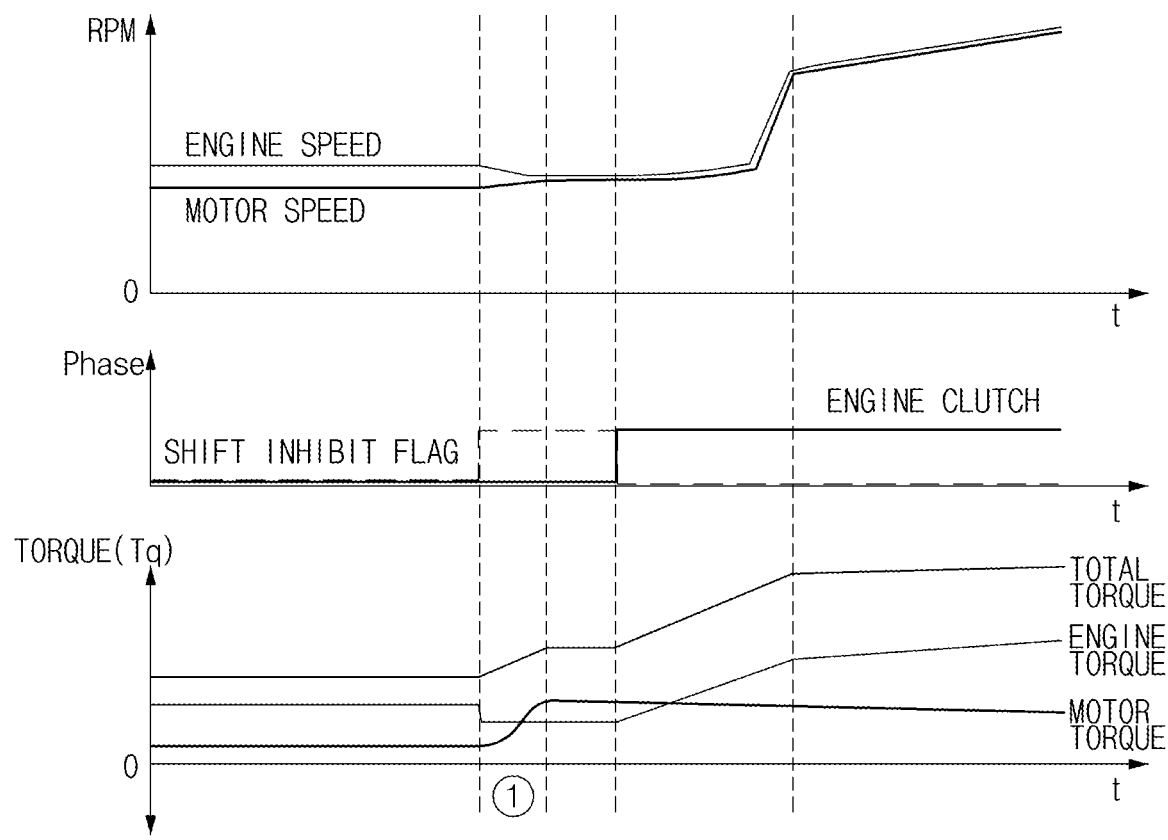
FIG. 2 illustrates a view for describing an engine clutch pre-engagement post-shift procedure of a TMED type of hybrid vehicle according to a conventional art.

FIG. 2 illustrates a view for describing an engine clutch pre-engagement post-shift procedure of a TMED type of a hybrid vehicle according to a conventional art.

Referring to FIG. 2, the hybrid vehicle 100 performs shift delay control by switching a shift inhibit flag to HIGH when a kickdown is detected while driven in the EV mode.

The hybrid vehicle 100 engages the engine clutch 30 during the shift delay control, enters a HEV mode, and performs kick-down shift control and acceleration control.

That is, conventionally, a process of transferring an engine torque to a driving shaft is sequentially performed after completing the lower gear shift when the kickdown is detected, and thus a time required for EV kickdown is equal to a sum of a time required to complete the lower gear shift and a time at which the engine torque is transferred to the driving shaft.

It is not a problem when a motor torque can cope with a torque required by a driver until the engine clutch 30 is locked up and the engine torque is transferred to the driving shaft, but otherwise, e.g., when a maximum torque limit of the motor is applied to be equal to or more than a base rpm, the driver may feel a sense of acceleration delay.

The sense of acceleration delay felt by the driver is one of the biggest factors that lower driving satisfaction, so it must be ameliorated.

In order to solve the above problem, when the lower gear shift and engine clutch control are performed in parallel, there is a problem that an initial engine torque is inaccurate due to insufficient air volume when starting the engine, which may adversely affect the drivability when an engine-motor torque is blended.

Figure 3:
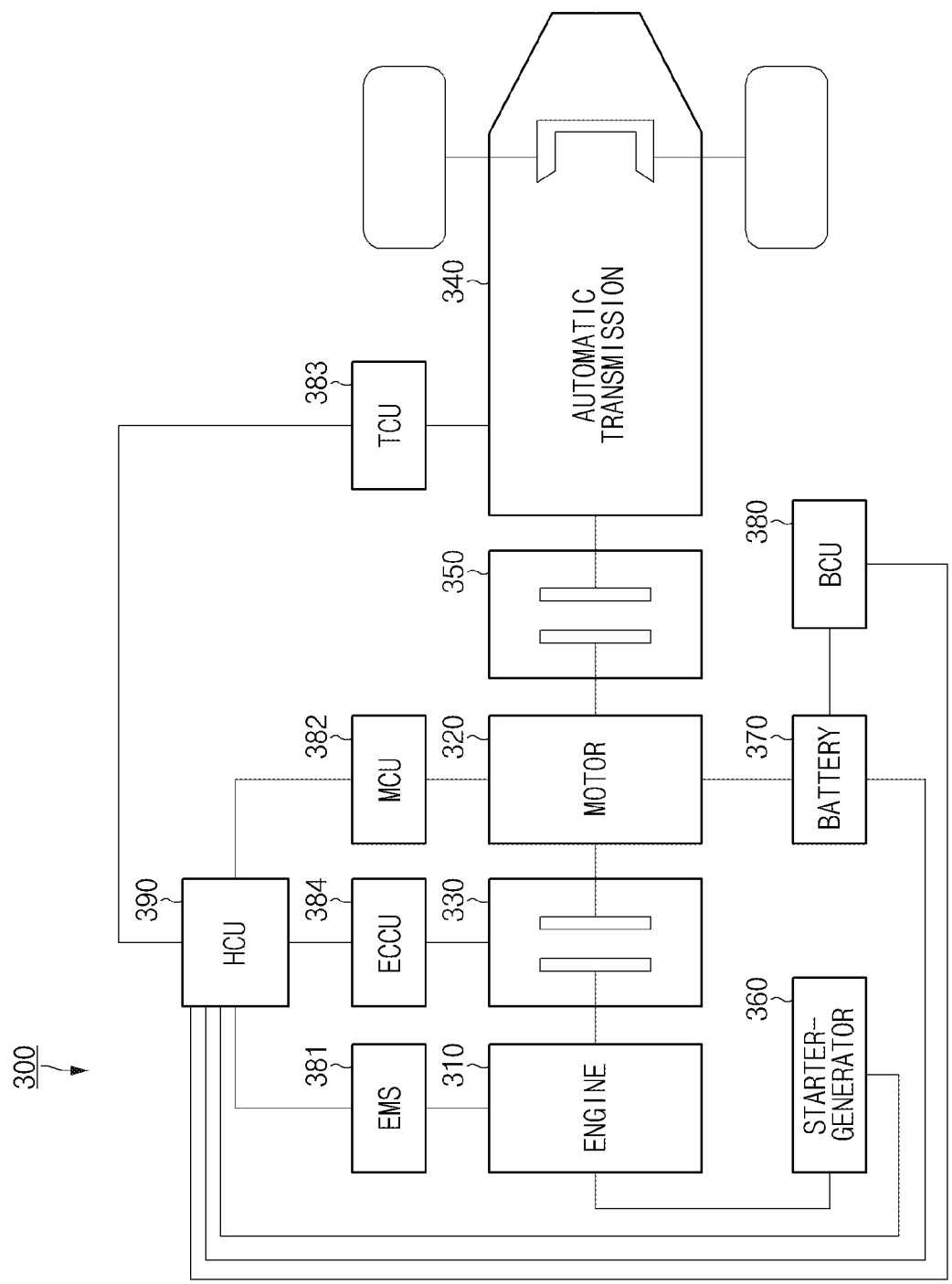
FIG. 3 illustrates a block diagram for describing a structure of a TMED type of hybrid vehicle according to an exemplary form of the present disclosure.

FIG. 3 illustrates a block diagram for describing a structure of a TMED type of hybrid vehicle according to an exemplary form of the present disclosure.

A hybrid electric vehicle uses an internal combustion engine and battery power together.

That is, the hybrid vehicle uses an efficient combination of powers of an internal combustion engine and the motor.

Referring to FIG. 3, the hybrid vehicle 300 may be configured to include an engine 310, a motor 320, an engine clutch 330 for regulating a power between the engine 310 and the motor 320, an automatic transmission 340, a transmission clutch 350 for performing a selective power transfer function, a starter-generator 360, a battery 370, a battery control unit (BCU) 380, an engine management system (EMS) 381, a motor control unit (MCU) 382, a transmission control unit (TCU) 383, and a hybrid control unit (HCU) 390.

Hereinafter, the motor 320 disposed between the automatic transmission 340 and the engine 310 may be referred to as a "driving motor 320" in order to distinguish between a motor provided in the starter-generator 360 and the motor 320 disposed between the automatic transmission 340 and the engine 310. For example, when an HSG is applied as the starter-generator 360, engine driving and charging may be controlled through a motor provided in the HSG.

As illustrated in FIG. 3, according to an exemplary form of the present disclosure, the hybrid vehicle 300 is a TMED type of hybrid vehicle including the engine clutch 330 installed between the engine 310 and the motor 320 and the transmission clutch 350 installed between the motor 320 and the automatic transmission 340.

The HCU 390 may control an entire operation of the hybrid vehicle 300. For example, the HCU 390 may output a torque command that should be outputted by the engine 310 and/or the motor 320, a target speed command of the engine 310, and the like.

The HCU 390 may determine whether a kickdown (K/D) occurs while driven in the EV mode.

For example, the HCU 390 may detect occurrence of an EV K/D event when an accelerator position sensor (APS) sensing value is greater than or equal to a specific value and/or when a K/D determination result by the TCU 383 is directly received.

As another example, in some cases, the HCU 390 may detect the occurrence of an EV K/D event based on vehicle speed information of the hybrid vehicle, i.e., information related to a change in a vehicle speed while driven in the EV mode.

The HCU 390 may perform engine speed control in conjunction with the EMS 381 and may perform lock-up control of the engine clutch 330 in conjunction with an engine clutch control unit (ECCU) 384.

The HCU 390 may perform part load control by transmitting commands of start control, i.e., engine cranking, of the engine 310 and an engine torque command to the starter-generator 360.

The HCU 390 may monitor a real-time engine speed and an engine torque in conjunction with the EMS 381.

The HCU 390 may control a throttle valve to be opened by a target opening degree when the engine speed reaches a predetermined reference value during the part load control. That is, wide open control may be performed to greatly open the throttle valve in order to rapidly increase the engine speed.

The HCU 390 may command engine speed control to the starter-generator 360 for speed synchronization when a difference between the engine speed and the motor speed is equal to or smaller than an arbitrary value δ.

After confirming the synchronization of the engine speed and the motor speed, the HCU 390 may transmit a hydraulic command to the ECCU 384 to lock up the engine clutch 330.

When the lock-up of the engine clutch 330 is confirmed through the ECCU 384, the HCU 390 may check a torque required by a driver and an engine transfer torque to control a motor torque to be reduced.

The HCU 390 may determine driving and charging of the starter-generator 360 by comparing the driver's required torque with a maximum motor torque.

The EMS 381 may control an operation of the engine 310 in conjunction with the HCU 390. The EMS 381 may adjust an opening degree of the throttle valve to match a target engine torque.

The MCU 382 may control an operation of the motor 320 in conjunction with the HCU 390. In addition, the MCU 382 may control an operation of the starter-generator 360.

The TCU 383 may control an operation of the automatic transmission 340 in conjunction with the HCU 390. The TCU 383 may start gear-shifting when the shift inhibit flag is not activated by the HCU 390, and may end gear-shifting when a speed difference between a transmission input phase and a target shift phase is within an allowable range.

The BCU 380 may monitor a state of the battery 370 to provide battery state information to the HCU 390.

The BCU 380 may also be referred to as a battery management system (BMS).

The starter-generator 360 may be an integrated starter & generator (ISG), a hybrid starter & generator (HSG) or a starter.

The hybrid vehicle 300 may include a driving mode such as an electric vehicle (EV) mode, which is a pure electric vehicle mode in which only the power of the motor 320 is used, a hybrid electric vehicle (HEV) mode in which a rotational power of the engine 310 is used as a main power while using a rotational power of the motor 320 as an auxiliary power, and a regenerative braking mode in which braking and inertia energy is recovered through generation of the motor 320 to be charged in the battery 370 when the vehicle is driven by braking or inertia.

In the case of a TMED type of hybrid vehicle including the automatic transmission 340 or a dual clutch transmission, while driven in the EV mode, when the driver's required torque suddenly increases, e.g., a kickdown occurs, the hybrid vehicle 300 performs shift down control to shift into a shift phase that is lower than a current driving shift phase.

The hybrid vehicle 300 needs to engage the engine clutch 330 disposed between the engine 310 and the motor 320 in order to perform shift-down shift control When the down shift is performed, the engine clutch 330 is engaged while the gear-shifting, but conventionally, the engine clutch 330 is engaged and then shifted, or is shifted and then engaged due to the complexity of gear-shifting control and control of the engine clutch 330, which leads to a problem that a driver's acceleration demand or required torque cannot be satisfied.

Figure 4:
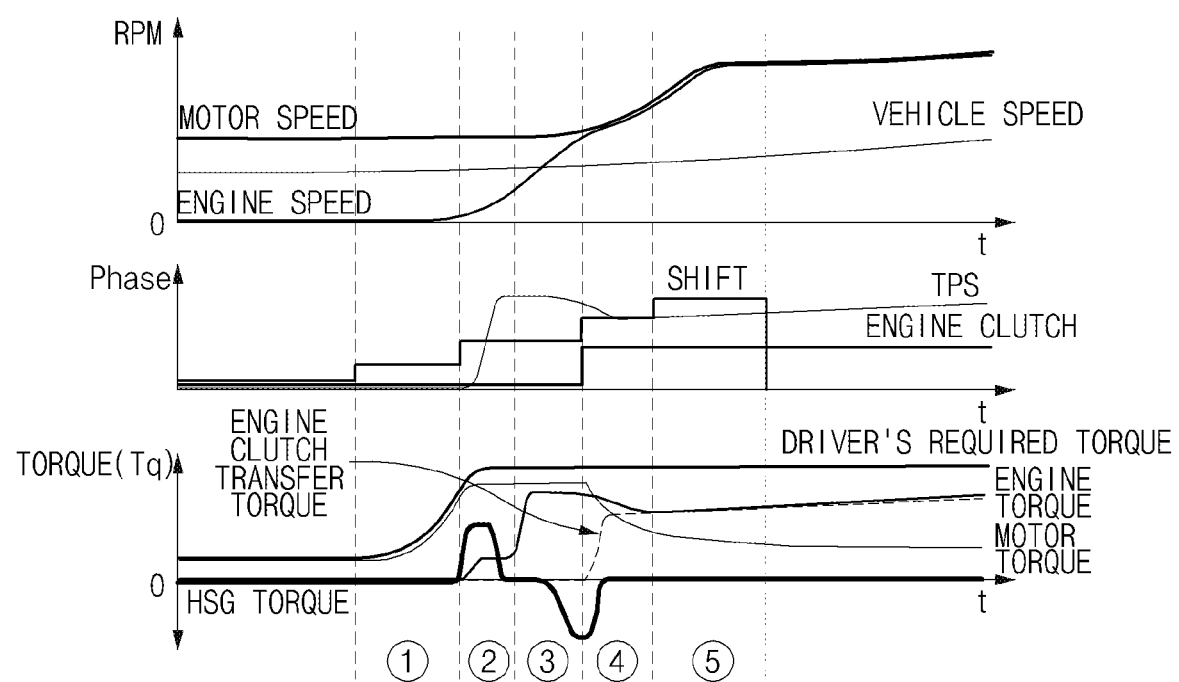
FIG. 4 illustrates a view for describing a procedure for performing engine clutch lock-up control during gear-shifting in a hybrid vehicle according to an exemplary form of the present disclosure.

FIG. 4 illustrates a view for describing a procedure for performing engine clutch lock-up control in a hybrid vehicle according to an exemplary form of the present disclosure.

Specifically, FIG. 4 illustrates a procedure of simultaneously performing the lower gear shift by the kickdown of the driver and lock-up of the engine clutch after starting of the engine while the TMED type of hybrid vehicle equipped with a motor, e.g., a HSG, capable of engine speed control is driven in the EV mode.

In the description of FIG. 4, the starter-generator 360 may indicate an HSG capable of controlling a speed of the engine 310.

The procedure of FIG. 4 may be largely divided into five periods ①, ②, ③, ④, and ⑤.

During the period ①, the hybrid vehicle may determine the kickdown of the driver based on a vehicle speed change and an APS input.

During the period ①, the driver presses the APS deeply during coasting or low tip-in driving to transfer a willingness to rapidly accelerate or overtake to the vehicle, and the engine is in an OFF state. The coasting or the low tip-in driving may indicate a state in which the driver is driving without pressing the APS, such as a neutral driving or a state in which the clutch is deeply pressed by the driver.

Thereafter, the hybrid vehicle may enter a part load mode and a lower gear shift preparation step.

In the case of the conventional "pre-engagement and post-shift" control method, the HCU 390 requests the TCU 383 not to shift, but in accordance with the control method according to one form of the present disclosure, the shift may be performed simultaneously with the change from the EV mode to the HEV mode, i.e., the engine clutch 330 is engaged, thereby reducing or minimizing a sense of acceleration delay of the driver.

The TCU 383 may transmit a current shift level and a target shift level to the HCU 390.

When receiving a start request signal from the HCU 390, the EMS 381 may crank the starter-generator 360, i.e., the HSG, capable of controlling the engine speed.

Since the engine torque is not transferred to the input phase of the automatic transmission 340 until the engine clutch 330 is locked up, the driving motor 320 must cope with a driver's required torque $T_{driver}$.

In this case, a maximum torque $T_{mot\_max}$ may be limited by a T-S curve of the driving motor 320, and thus driving motor 320 may output a smaller value of $T_{driver}$ and $T_{mot\_max}$ at a current speed.

During the period ②, the hybrid vehicle may start the engine and control of a throttle position sensor (TPS). The hybrid vehicle may be started with a motor (ex. HSG) capable of torque control, and when the engine speed $N_{eng}$ satisfies $N_{eng} \geq \varepsilon$, a throttle valve may be opened by a target opening degree.

Herein, $\varepsilon$ may be a minimum speed at which the engine 310 can be torqued under a given condition. The target opening degree may be set by rapidly increasing the engine speed $N_{eng}$ to calculate a required engine torque to be synchronized with a speed $N_{mot}$ of the drive motor 320.

In this process, the hybrid vehicle according to the present disclosure may be controlled to open the throttle valve earlier than the conventional control method such that air is rapidly introduced into the engine 310 compared to existing control. Accordingly, it is possible to effectively solve the problem that it was difficult to secure drivability during torque blending because the engine torque was incorrect when the engine 310 was started. In addition, it is possible to shorten an engaging time of the engine clutch 330 by obtaining an engine torque required to increase the speed of the engine 310 earlier.

During the period ③, for the lock-up of the engine clutch 330, the engine 310 may be controlled to output a certain torque, and the starter-generator 360 may start engine speed control. When the throttle valve is opened quickly and a large amount of air is sucked into the engine 310, the engine torque may be overshooted over the command during periods ② and ③, which may be offset by the starter-generator 360.

In the case of $N_{eng} - N_{mot} \leq \delta$, the starter-generator 360 may perform stable speed control by using an engine torque for charging except for a torque required for speed control. Herein, $\delta$ may be determined based on $N_{eng}$, $N_{mot}$ and a maximum torque that the starter-generator 360 can be charged at a current speed. The starter-generator 360 may perform preparation for the lock-up of the engine clutch 330 by performing engine speed control for synchronizing with rpm of the motor 320.

During the period ④, after confirming engine-motor speed synchronization, the hybrid vehicle may engage the engine clutch 330. When the engine clutch 330 is engaged, the engine torque is transferred to an input shaft of the automatic transmission 340, and rpm of the input shaft of the automatic transmission 340 may rise.

Behavior of the starter-generator 360 may be determined as follows depending on a driver's required torque $T_{driver}$ and a maximum motor torque $T_{mot\_max}$ at a corresponding speed i) $T_{driver} \leq T_{mot\_max}$: the motor torque copes with the driver's required torque until the engine clutch 330 is locked up, and a charging amount is reduced depending on the target transfer torque $T_{driver}$ in the starter-generator 360. At the same time, torque blending is performed.

ii) $T_{driver} > T_{mot\_max}$: the torque blending may start after the lock-up of the engine clutch 330, and the starter-generator 360 may participate in driving to satisfy the driver's required torque $T_{driver}$ when necessary.

During the period ⑤, the shift is completed.

FIG. 5 illustrates a table summarizing a procedure for performing the engine clutch lock-up control during gear-shifting in the hybrid vehicle, described in FIG. 4.

A driving mode of the hybrid vehicle is divided into an engine part load mode Part Load and an engine full load mode Full Load depending on a degree of engine load. In the engine full load mode, a purpose thereof is to realize maximum performance of the engine, so engine efficiency is drastically reduced and fuel consumption is rapidly increased.

In general, in the hybrid vehicle, a condition of entering the full load mode Full Load is satisfied when the driver's required torque is greater than a sum of a maximum torque (hereinafter, referred to as "maximum torque of engine part load") that can be outputted in the engine part load mode and a motor dischargeable torque that can assist engine output through discharge.

That is, when the driver's required torque is greater than the sum of the maximum torque of the engine part load and the motor dischargeable torque, the entering condition to the engine full load mode may be satisfied.

Specifically, a current condition for entering the full load mode is "the maximum torque of engine part load+(the motor dischargeable torque−Anti-Jerk TQ. margin)"

Figure 6:
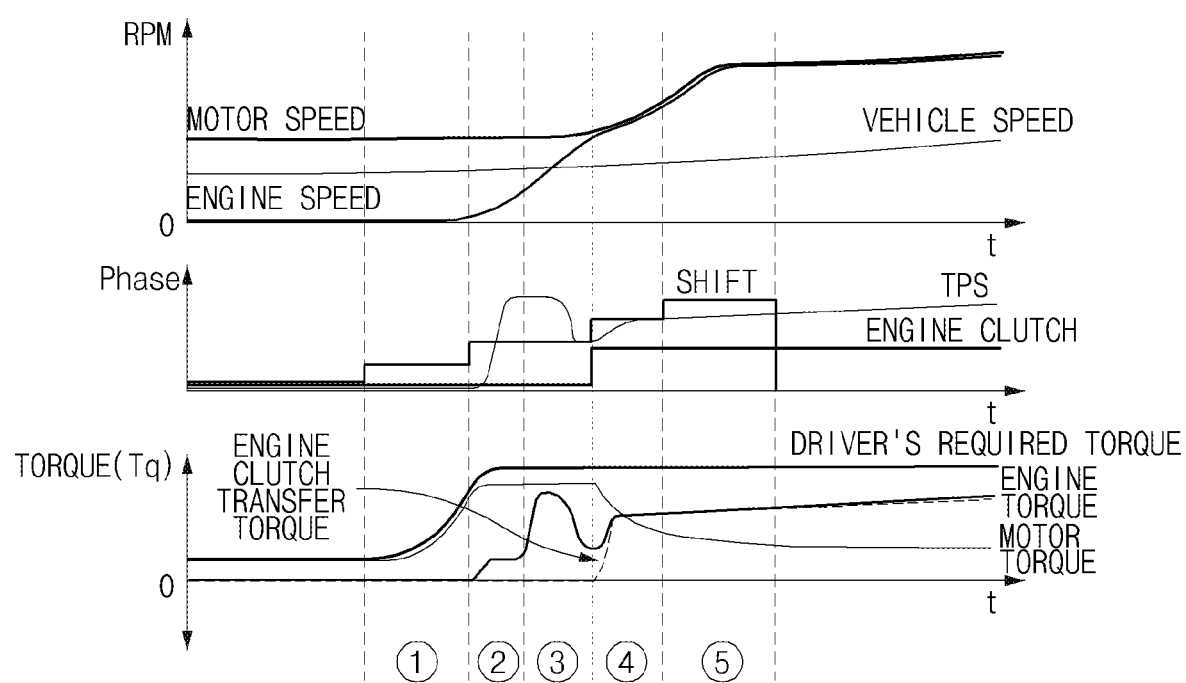
FIG. 6 illustrates a view for describing a procedure for performing engine clutch lock-up control during gear-shifting in a hybrid vehicle according to another exemplary form of the present disclosure.

FIG. 6 illustrates a view for describing a procedure for performing engine clutch lock-up control during gear-shifting in a hybrid vehicle according to another exemplary form of the present disclosure.

Specifically, FIG. 6 illustrates a procedure of simultaneously performing the lower gear shift by the kickdown of the driver and lock-up of the engine clutch after starting of the engine while the TMED type of hybrid vehicle equipped with a starter, e.g., an ISG or a 12V starter, not capable of engine speed control is driven in the EV mode.

The procedure of FIG. 6 may be largely divided into five periods ①, ②, ③, ④, and ⑤.

Differences from the kickdown control during the EV mode driving of the TMED vehicle equipped with the motor capable of the engine speed control of FIG. 4 to FIG. 5 described above are processes of the periods ③ to ⑤.

Referring to FIG. 6, the difference is that a starter starts the engine instead of the HSG during the period ③, and the difference is that the engine 310 performs the engine speed control instead of the HSG during the periods ④ and ⑤.

The other processes are the same as the control of the TMED type of hybrid vehicle equipped with the HSG, which is the motor capable of the engine speed control.

FIG. 7 illustrates a table summarizing a procedure for performing the engine clutch lock-up control during gear-shifting in the hybrid vehicle, described in FIG. 6.

Figure 8:
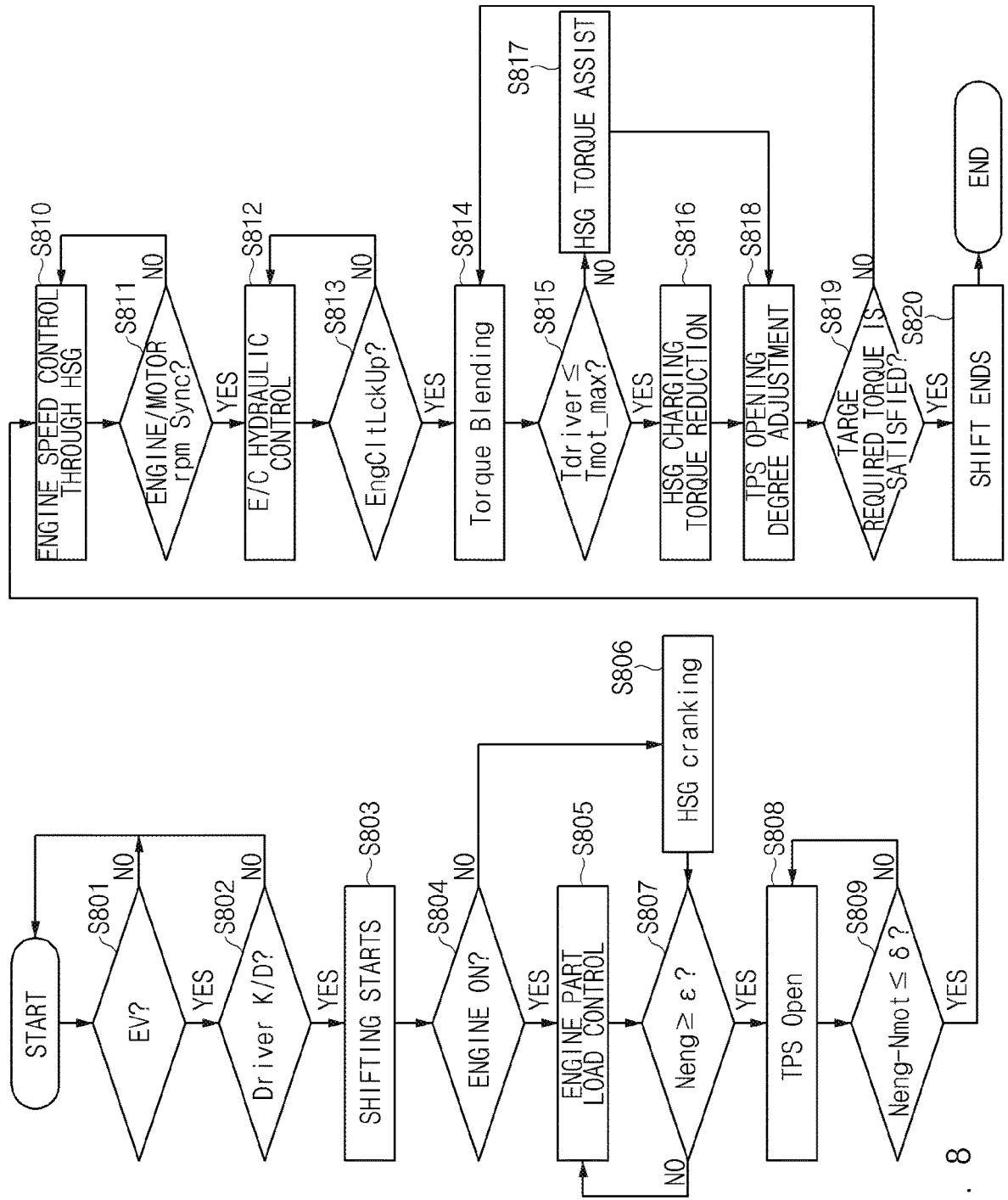
FIG. 8 illustrates a flowchart for describing a method for controlling gear-shifting of a hybrid vehicle and lock-up of an engine clutch according to an exemplary form of the present disclosure.

FIG. 8 illustrates a flowchart for describing a method for controlling gear-shifting of a hybrid vehicle and lock-up of an engine clutch according to an exemplary form of the present disclosure.

Specifically, FIG. 8 illustrates a flowchart for describing a method for controlling gear-shifting of a vehicle and lock-up of an engine clutch when detecting a kickdown during autonomous driving in a TMED type of hybrid vehicle equipped with a HSG.

Referring to FIG. 8, when the hybrid vehicle detects a kickdown operation of the driver while driven in the EV mode, shift control may be started (S801 to S803).

The hybrid vehicle may determine whether to drive the engine (S804).

As a result of the determination, when the engine is in a driving state, the hybrid vehicle may perform engine part load control (S805).

As a result of the determination in step S804, when the engine is not driven, the hybrid vehicle may drive the engine through the HSG (HSG cranking, S806).

The hybrid vehicle may compare an engine speed Neng with a first reference value ε (S807).

As a result of the comparison, when the engine speed Neng is equal to or greater than the first reference value ε, the hybrid vehicle may open the throttle valve by a target opening degree (S808). Herein, ε may be a minimum speed at which the engine 310 can generate a torque under a given condition. When the throttle valve is opened by the target opening degree through the throttle position sensor (TPS), the engine speed Neng of the hybrid vehicle may rise rapidly. The TPS may be mounted in a throttle body to perform a function of detecting an opening degree of the throttle valve.

As a result of the comparison in step S806, when the engine speed Neng is smaller than the first reference value ε, the hybrid vehicle may continue to perform engine part load control until the condition is satisfied.

After opening the throttle valve by the target opening degree, the hybrid vehicle may compare a difference value between the engine speed Neng and a driving motor speed Nmot with a second reference value δ (S809).

As a result of the determination, when the difference value between the engine speed Neng and the driving motor speed Nmot is smaller than or equal to the second reference value δ, the hybrid vehicle may perform engine speed control through the HSG (S810).

That is, when the difference between the engine speed and the speed of the driving motor falls to be equal to and smaller than a certain level, the hybrid vehicle may perform engine-motor synchronization through the engine speed control.

The hybrid vehicle may determine whether the synchronization is performed by comparing rpms of the motor and the engine during the engine speed control through the HSG (S811).

As a result of the determination, when the synchronization is performed, the hybrid vehicle may perform hydraulic control to lock up the engine clutch (S812).

When the lock-up of the engine clutch is completed, i.e., it is in an EngCltLckUp state, the hybrid vehicle may perform torque blending (S813 and S814).

The hybrid vehicle may compare the driver's required torque $T_{driver}$ with the maximum output torque $T_{mot\_max}$ of the motor (S815).

As a result of the comparison, when the maximum output torque $T_{mot\_max}$ of the motor is greater than the driver's required torque $T_{driver}$, the hybrid vehicle may adjust an opening degree of the throttle valve through the TPS to reduce an engine torque and a HSG charging torque (S816 and S818). Herein, when the HSG charging torque is reduced, an engine transfer torque may increase to reduce the output torque of the motor.

When the maximum torque of the motor is greater than the driver's required torque, a single motor may cope with the driver's required torque, and thus, the HSG is charged with a remaining engine torque except for the torque required to control the engine speed before the lock-up of the engine clutch, and the HSG charging torque may be reduced by calculating a target transfer torque required for torque blending after the engine clutch is engaged.

As a result of the comparison in step S815, when the maximum output torque $T_{mot\_max}$ of the motor is equal to or smaller than the driver's required torque $T_{driver}$, the hybrid vehicle may adjust an opening degree of the throttle valve for assisting engine and HSG torques (S817 and S818).

The hybrid vehicle may end gear-shifting when the target required torque is satisfied (S819 and S820).

When the target required torque is not satisfied, the hybrid vehicle may enter the above-described torque blending step (S814).

Figure 9:
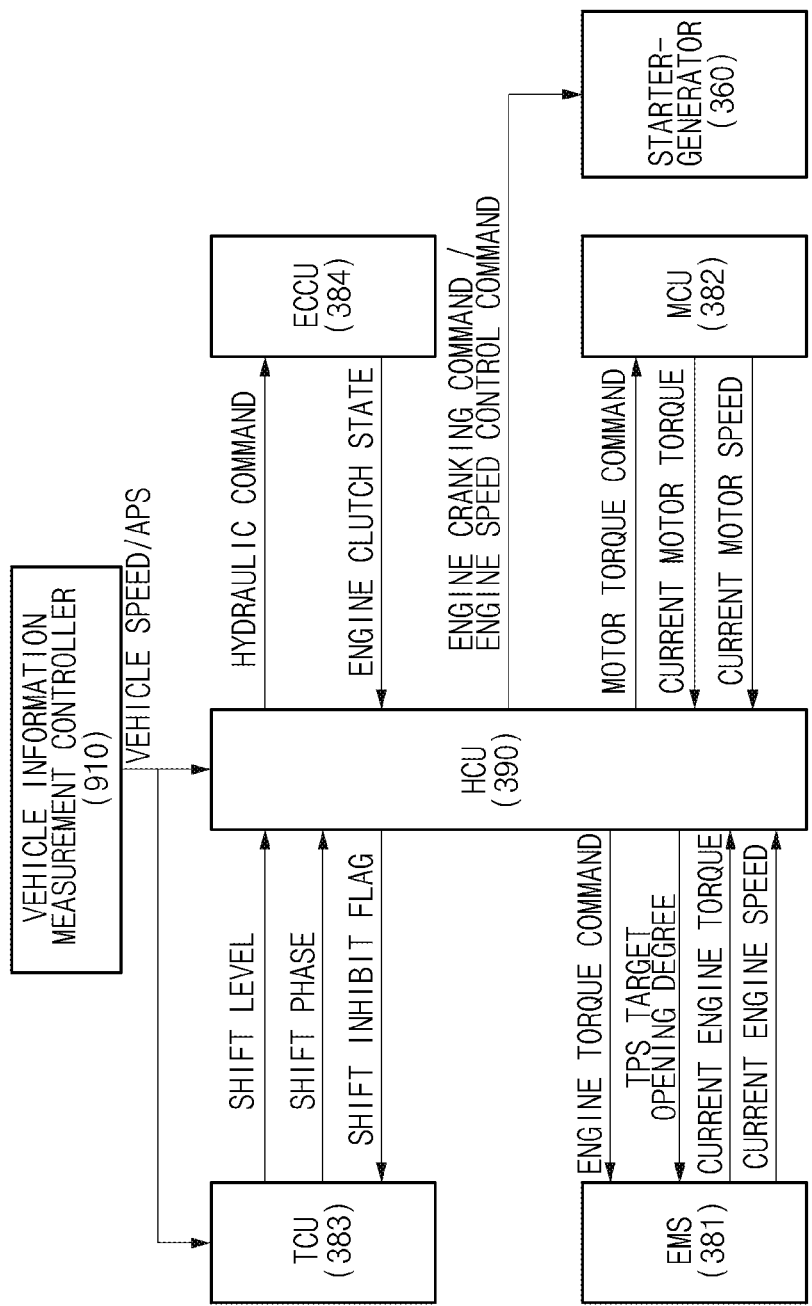
FIG. 9 illustrates a flowchart for describing a cooperative control operation between controllers of a hybrid vehicle according to an exemplary form of the present disclosure.

FIG. 9 illustrates a flowchart for describing a cooperative control operation between controllers of a hybrid vehicle according to an exemplary form of the present disclosure.

Referring to FIG. 9, a vehicle information measurement controller 910 may provide vehicle speed information and APS information to the HCU 390 and the TCU 383.

The HCU 390 may output a torque command that should be outputted by the engine 310 and/or the motor 320, a target speed control command of the engine 310, and the like.

The HCU 390 may determine whether to perform kick-down (K/D) while driven in the EV mode. For example, the HCU 390 may determine occurrence of an EV K/D event when an accelerator position sensor (APS) sensing value is greater than or equal to a specific value and/or when a K/D determination result by the TCU 383 is directly received.

The HCU 390 may perform engine torque and speed control in conjunction with the EMS 381 and the starter-generator 360, e.g., a HSG, and may perform lock-up control of the engine clutch 330 in conjunction with the ECCU 384.

The HCU 390 may perform part load control by transmitting commands of start control, i.e., engine cranking, of the engine 310 and an engine torque command to the starter-generator 360.

The HCU 390 may monitor a current engine speed and a current engine torque in conjunction with the EMS 381.

The HCU 390 may control the throttle valve to be opened by a target opening degree by transmitting a predetermined control command to the EMS 381 when the engine speed is equal to or greater than a predetermined reference value during part load control. That is, the HCU 390 may perform wide open control that greatly opens the throttle valve in order to rapidly increase the engine speed during the part load control.

The HCU 390 may command engine speed control to the starter-generator 360, i.e., a HSG, for engine-motor speed synchronization when a difference between the engine speed and the motor speed is equal to or smaller than an arbitrary reference value.

After confirming the synchronization of the engine speed and the motor speed, the HCU 390 may transmit a hydraulic command to the ECCU 384 to control the engine clutch 330 to be locked up.

When the lock-up of the engine clutch 330 is confirmed through the ECCU 384, the HCU 390 may check the driver's required torque and the engine transfer torque, and may control the motor torque depending on the confirmation result.

The HCU 390 may determine driving and charging of the starter-generator 360 depending on a result obtained by comparing the driver's required torque with the maximum motor torque. For example, when the driver's required torque is greater than the maximum motor torque, the HCU 390 may control the starter-generator 360 to increase the engine transfer torque. On the other hand, when the driver's required torque is smaller than the maximum motor torque, the HCU 390 may control the starter-generator 360 to reduce the engine transfer torque.

The EMS 381 may control an operation of the engine 310 in conjunction with the HCU 390. The EMS 381 may adjust an opening degree of the throttle valve to match a target engine torque.

The MCU 382 may control an operation of the motor 320 in conjunction with the HCU 390.

The HCU 390 may directly control an operation of the starter-controller 360 as illustrated in FIG. 3. Herein, the starter-generator 360 may be any one of a HSG, an ISG, and a starter.

In another exemplary form, as illustrated in FIG. 9, the HCU 390 may control the operation of the starter-generator 360 through the MCU 382.

The TCU 383 may control an operation of the automatic transmission 340 in conjunction with the HCU 390.

The TCU 383 may start gear-shifting when the shift inhibit flag is not activated by the HCU 390, and may end gear-shifting when a speed difference of one output phase of the transmission is within an allowable range. That is, when the target required torque is satisfied, the TCU 383 may end gear-shifting.

Figure 10:
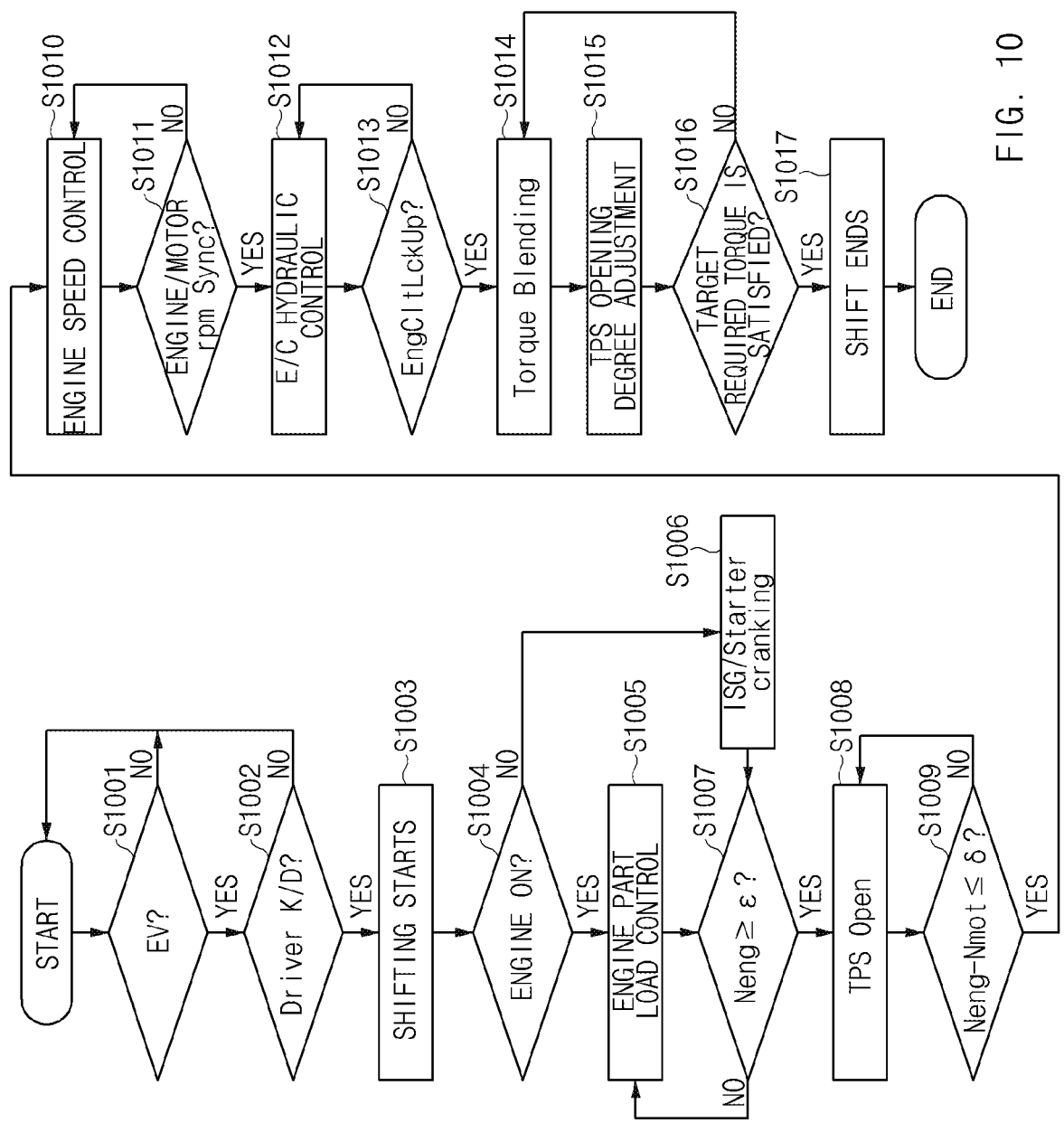
FIG. 10 illustrates a flowchart for describing a method for controlling gear-shifting of a hybrid vehicle and lock-up of an engine clutch according to another exemplary form of the present disclosure.

FIG. 10 illustrates a flowchart for describing a method for controlling gear-shifting of a hybrid vehicle and lock-up of an engine clutch according to another exemplary form of the present disclosure.

Specifically, FIG. 10 illustrates a flowchart for describing a method for controlling gear-shifting of a vehicle and lock-up of an engine clutch when detecting a kickdown during EV driving in a TMED type of hybrid vehicle equipped with an ISG or a starter.

Referring to FIG. 10, when the hybrid vehicle detects a kick-down operation of the driver while driven in the EV mode, shift control may be started (S1001 to S1003).

The hybrid vehicle may determine a driving state of the engine (S1004).

As a result of the determination, when the engine is in a driving state, the hybrid vehicle may perform engine part load control (S1005).

As a result of the determination in step S1004, when the engine is not driven, the hybrid vehicle may control the ISG or the starter to drive the engine (ISG/starter cranking, S1006).

The hybrid vehicle may compare an engine speed Neng with a first reference value ε (S1007).

As a result of the comparison, when the engine speed Neng is equal to or greater than the first reference value ε, the hybrid vehicle may open the throttle valve by a target opening degree (TPS Open, S1008). Herein, c may be a minimum speed at which the engine 310 can generate a torque under a given condition. When the throttle valve is opened largely through the throttle position sensor (TPS), air rapidly may be introduced into the engine to rapidly increase the engine speed Neng of the hybrid vehicle. In this case, the TPS may be mounted in a throttle body to perform a function of detecting the opening of the throttle valve.

As a result of the comparison in step S1006, when the engine speed Neng is smaller than the first reference value ε, the hybrid vehicle may continue to perform engine part load control until the condition is satisfied.

After opening the throttle valve by the target opening degree, the hybrid vehicle may compare a difference value between the engine speed Neng and a driving motor speed Nmot with a second reference value δ (S1009).

As a result of the determination, when the difference value between the engine speed Neng and the driving motor speed Nmot is smaller than or equal to the second reference value δ, the hybrid vehicle may perform engine speed control through the EMS 381 (S1010). That is, when the difference between the engine speed and a speed of the driving motor falls to be equal to and smaller than a certain level, the hybrid vehicle may perform engine-motor speed synchronization by controlling the engine speed through the EMS 381.

The hybrid vehicle may determine whether the synchronization is performed by comparing rpms of the motor and the engine during the engine speed control through the EMS 381 (S1011).

As a result of the determination, when the synchronization is performed, the hybrid vehicle may perform hydraulic control by transmitting a predetermined control command to the ECCU 384 to lock up the engine clutch (S1012).

When the lock-up of the engine clutch is completed, i.e., it is in an EngCltLckUp state, the hybrid vehicle may perform torque blending (S1013 and S1014).

The hybrid vehicle may end gear-shifting when it reaches a target required torque through throttle valve opening adjustment, i.e., when the target requested torque is satisfied (S1015 to S1017).

Steps of a method or algorithm described in connection with the exemplary forms disclosed herein may be directly implemented by hardware, a software module, or a combination of the two, executed by the processor. The software module may reside in a storage medium (i.e., the memory and/or the storage) such as a RAM memory, a flash memory, a ROM memory, an EPROM memory, an EEPROM memory, a register, a hard disk, a removable disk, and a CD-ROM.

An exemplary storage medium is coupled to the processor, which can read information from and write information to the storage medium. Alternatively, the storage medium may be integrated with the processor. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Therefore, the exemplary forms disclosed in the present disclosure are not intended to limit the technical ideas of the present disclosure, but to explain them, and the scope of the technical ideas of the present disclosure is not limited by these exemplary forms. The protection range of the present disclosure should be interpreted by the claims below, and all technical ideas within the equivalent range should be interpreted as being included in the scope of the present disclosure.

What is claimed is:

1. A control method for controlling a gear-shifting and lock-up of an engine clutch in a hybrid vehicle equipped with the engine clutch, an engine and a motor, the method comprising:
   detecting, by a processor, a kickdown shift by a driver while the hybrid vehicle is driving in an electric vehicle mode;
   when the kickdown shift is detected, starting, by the processor, gear-shifting of the hybrid vehicle;
   controlling, by the processor, a difference between an engine speed and a motor speed to be equal to or less than a first reference value;
   synchronizing, by processor, the engine speed and the motor speed through an engine speed control;
   when the synchronization is completed, performing, by the processor, torque blending by locking up the engine clutch; and
   when a target required torque is reached through the torque blending, ending, by the processor, the gear-shifting,
   wherein gear-shifting of the hybrid vehicle and locking up the engine clutch are performed in parallel, and
   wherein performing the torque blending includes:
      reducing, by the processor, a charging torque of a hybrid starter-generator when a maximum motor torque is greater than or equal to a driver's required torque while performing the torque blending, and
      performing, by the hybrid starter-generator, charging as much as a remaining engine torque except for a torque required to control the engine speed before the engine clutch is locked up, and
      reducing, by the hybrid starter-generator, the charging torque by calculating a target transfer torque required for the torque blending after the engine clutch is engaged,
      performing, by the hybrid starter-generator, a torque assist when the maximum motor torque is less than the driver's required torque while the torque blending is performed.

2. The control method of claim 1, wherein
controlling the difference between the engine speed and the motor speed includes:
   checking whether the engine is driven; and
   performing an engine part load control until the engine speed reaches a second reference value while the engine is driven; and
   when the engine speed reaches the second reference value, opening a throttle valve by a target opening degree.

3. The control method of claim 2, wherein the second reference value is a minimum speed corresponding to a torque that the engine is able to generate under a predetermined condition.

4. The control method of claim 2, further comprising: driving the engine when the engine is not driven.

5. The control method of claim 4, wherein the engine is driven by the hybrid starter-generator, an integrated starter-generator, or a starter.

6. The control method of claim 4, wherein a speed control of the engine is performed by the hybrid starter-generator when the engine is driven by the hybrid starter-generator.

7. The control method of claim 4, wherein:
   the hybrid vehicle includes an engine management system configured to control an operation of the engine, and
   a speed control of the engine is performed by the engine management system when the engine is driven by an integrated starter-generator or a starter.

8. The control method of claim 1, wherein the kickdown shift by the driver is detected based on at least one of accelerator position sensor (APS) information or vehicle speed information of the hybrid vehicle.

9. A hybrid vehicle comprising:
   an engine;
   a motor;

an engine clutch disposed between the engine and the motor; and a processor configured to:
control operations of the engine, the motor, and the engine clutch,
when a kickdown shift by a driver is detected, start gear-shifting while the hybrid vehicle is driving in an electric vehicle mode,
control a difference between an engine speed and a motor speed to be equal to or less than a first reference value,
when the engine speed is synchronized with the motor speed through an engine speed control, perform torque blending by locking up the engine clutch, and
when a target required torque is reached through the torque blending, finish the gear-shifting,
wherein the processor is further configured to:
perform the gear-shifting and the locking up of the engine clutch in parallel, and
control a charging torque of a hybrid starter-generator to be reduced when a maximum motor torque is greater than or equal to a driver's required torque while performing the torque blending,
wherein the hybrid starter-generator is configured to:
perform charging as much as a remaining engine torque except for a torque required to control the engine speed before the engine clutch is locked up, and reduce the charging torque by calculating a target transfer torque required for the torque blending after the engine clutch is engaged, and
wherein when the maximum motor torque is less than the driver's required torque while performing the torque blending, the processor is further configured to perform a torque assist by the hybrid starter-generator.

10. The hybrid vehicle of claim 9, wherein the processor is further configured to:
perform an engine part load control until the engine speed reaches a second reference value in a state in which the engine is driven, and
when the engine speed reaches the second reference value, control a throttle valve to be opened by a target opening degree.

11. The hybrid vehicle of claim 10, wherein the second reference value is a minimum speed corresponding to a torque that the engine is able to generate under a predetermined condition.

12. The hybrid vehicle of claim 10, wherein the processor is further configured to drive the engine when the engine is not driven.

13. The hybrid vehicle of claim 12, wherein the engine is driven by the hybrid starter-generator, an integrated starter-generator, or a starter.

14. The hybrid vehicle of claim 12, wherein the processor is further configured to perform the engine speed control by the hybrid starter-generator when the engine is driven by the hybrid starter-generator.

15. The hybrid vehicle of claim 12, wherein:
the hybrid vehicle includes an engine management system configured to control an operation of the engine, and
the processor is configured to perform the engine speed control by the engine management system when the engine is driven by an integrated starter-generator or a starter.

16. The hybrid vehicle of claim 9, further comprising:
a vehicle information measure controller configured to provide accelerator position sensor (APS) information and vehicle speed information of the hybrid vehicle to the processor, and
wherein the processor is further configured to detect the kickdown shift based on at least one of the vehicle speed information or the APS information.

* * * * *